US009680847B2

(12) United States Patent
Alme

(10) Patent No.: US 9,680,847 B2
(45) Date of Patent: *Jun. 13, 2017

(54) STRUCTURAL RECOGNITION OF MALICIOUS CODE PATTERNS

(71) Applicant: McAfee, Inc., Santa Clara, CA (US)

(72) Inventor: Christoph Alme, Paderborn (DE)

(73) Assignee: McAfee, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/885,765

(22) Filed: Oct. 16, 2015

(65) Prior Publication Data
US 2016/0119366 A1    Apr. 28, 2016

Related U.S. Application Data

(63) Continuation of application No. 12/477,619, filed on Jun. 3, 2009, now Pat. No. 9,177,144.

(60) Provisional application No. 61/109,666, filed on Oct. 30, 2008.

(51) Int. Cl.
H04L 29/06    (2006.01)
G06F 17/30    (2006.01)
G06F 21/56    (2013.01)

(52) U.S. Cl.
CPC .... H04L 63/1416 (2013.01); G06F 17/30961 (2013.01); G06F 21/563 (2013.01); H04L 63/145 (2013.01)

(58) Field of Classification Search
CPC ............... H04L 63/1416; H04L 63/145; G06F 17/30961; G06F 21/563
See application file for complete search history.

(56) References Cited

U.S. PATENT DOCUMENTS

| 5,452,442 A * | 9/1995 | Kephart | G06F 21/564 713/188 |
| 7,162,741 B2 * | 1/2007 | Eskin | H04L 63/1416 707/999.202 |
| 7,877,806 B2 * | 1/2011 | Repasi | G06F 21/554 713/188 |
| 2007/0094734 A1 * | 4/2007 | Mangione-Smith | G06F 21/564 726/24 |

(Continued)

OTHER PUBLICATIONS

David Belton "Boolean Algebra", Apr. 1998, 4 pages, retrieved from http://www.ee.surrey.ac.uk/Projects/Labview/boolalgebra.*

Primary Examiner — Catherine Thiaw
(74) Attorney, Agent, or Firm — Blank Rome LLP

(57) ABSTRACT

Various embodiments include an apparatus comprising a detection database including a tree structure of descriptor parts including one or more root nodes and one or more child nodes linked to from one or more parent descriptor parts chains, each of the root nodes representing a descriptor part, and each root node linked to at least one of the child nodes, each root node and each child node linked to any possible additional child nodes, wherein the possible additional child nodes include any possible successor child nodes and a descriptor comparator coupled to the detection database, the descriptor comparator operable to receive data including a plurality of logic entities, once or successively, and to continuously compare logic entities provided to the tree structure of descriptor parts stored in detection database, and to provide an output based on the comparison.

20 Claims, 6 Drawing Sheets

(56) References Cited

U.S. PATENT DOCUMENTS

| | | | |
|---|---|---|---|
| 2007/0240217 A1* | 10/2007 | Tuvell | G06F 21/56 726/24 |
| 2009/0077664 A1* | 3/2009 | Hsu | G06F 21/566 726/24 |
| 2011/0047618 A1* | 2/2011 | Evans | G06F 21/566 726/23 |
| 2011/0307956 A1* | 12/2011 | Yermakov | H04L 63/0227 726/24 |
| 2012/0072988 A1* | 3/2012 | Agrawal | G06F 21/561 726/24 |
| 2013/0247190 A1* | 9/2013 | Spurlock | H04L 63/1425 726/23 |
| 2016/0042180 A1* | 2/2016 | Sayre | G06F 21/563 726/23 |

* cited by examiner

STRUCTURAL RECOGNITION OF MALICIOUS CODE PATTERNS

CROSS REFERENCE TO RELATED APPLICATIONS

This application is a continuation of U.S. application Ser. No. 12/477,619, filed Jun. 3, 2009, which claims the priority benefit of U.S. Provisional Application Ser. No. 61/109,666 filed Oct. 30, 2008, the content of both of which is incorporated herein by reference in its entirety.

TECHNICAL FIELD

The present invention is related to computer network security, and more particularly, to systems and methods for recognition of malicious code patterns.

BACKGROUND ART

Increased access to the Internet has had the unintended effect of increasing the reach of software programs that capture personal information of users without their informed consent ("Spyware") or that corrupt computers without the user's knowledge and informed consent ("Malware"). In addition, a cottage industry has arisen in software that automatically downloads and displays advertising while an application is being used ("Adware"). The terms malicious code pattern and malicious code include any type of software programs or code designed to infiltrate or damage a computer system without the owner's informed consent, regardless of the motivation for the software program, and regardless of the results caused by the software program on the owner's devices, systems, networks, or data.

DESCRIPTION OF EMBODIMENTS

Figure 1:
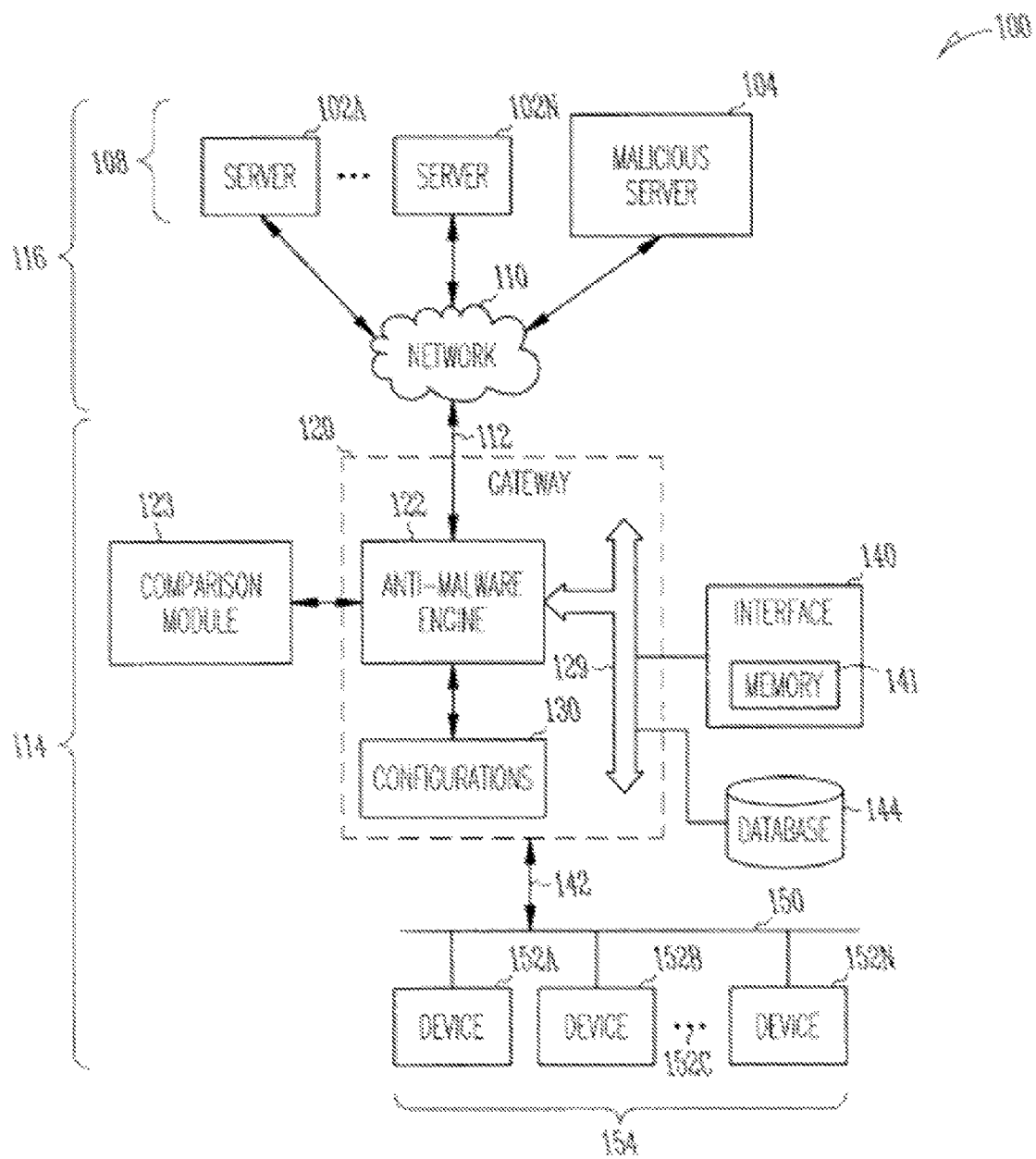
FIG. 1 illustrates a computer network according to various embodiments.

In the following detailed description, reference is made to the accompanying drawings which form a part hereof, and in which is shown by way of illustration specific embodiments in which the invention can be practiced. It is to be understood that other embodiments may be utilized and structural changes can be made without departing from the scope of the present invention.

Malware authors frequently change (albeit small) parts of their creations, re-pack or re-compile new variants, in order to avoid detection by signature- or checksum based methods. "Proven" code patterns found in an older variant of a malware family, or found in a publicly available Proof-of-Concept implementation, are very likely to be reused in later variants of the same malware family or other implementations for exploitation of known vulnerabilities. These variations thus may avoid detection by signature based or checksum based detection methods.

Therefore, systems, particular apparatus, and methods that determine the presence of a known code pattern that had been found in a malicious code before, in a new, yet unknown file would improve proactive detection rate on any such malware variants. While a "fingerprint" of a file is expected to be unique, e.g. no two different files should produce the same fingerprint—like, for example, the file's MD5 checksum (128 bit), an algorithm allowing such proactive malware detection clearly needs to avoid any reliance on uniqueness as it would otherwise again be vulnerable to bypassing via slight modifications of the malicious code pattern.

Various embodiments of the systems and methods presented herein utilize two facts to overcome these deficiencies in previous detection systems and methods:

malware authors will continue to reuse "proven" code portions in future malware variants, and continue to only slightly modify their pests in order to bypass signature- or checksum-based detection; changing the actual implementation code would be too expensive.

compilers, albeit minor changes to the source code, typically do generate the same layout for its executables during several compiler runs: instructions may change between compilations, especially register usage, but the logical structure of process flow statements, application programming interface (API) calls and algorithmic data operations, will remain the same.

Various embodiments described herein include methods that target scripting languages, such as JavaScript and Visual Basic Script, and can equally be applied on any mobile code file formats, including native code formats, such as Microsoft's Win32 Portable Executable (PE) file format or Unix' Executable and Linking format (ELF), and byte code formats, such as the Java™ class file format.

In general, the various methods are beneficial as they allow a system or particular apparatus to proactively detect new variants of known malware families, generically detect usage of known obfuscation methods, assign correct malware type and family to previously unknown new malware variants, scan files "on-the-fly", e.g. the comparison can start while the file may not yet be completely downloaded, thereby allowing streaming, work on file parts rather than requiring a complete file, has a low memory footprint that is as low as traditional scan string signatures, perform weight-based matching and user-definable adjustment of match aggressiveness, works commonly for all mobile code programming languages that can be dissected into process flow statements, code branching statements (like function calls), variable definition and modification statements, and parameters passed along with calls, semi-automatically compile a detection database, and to work "adaptively", that is, upon detection of a new variant using a known code pattern, a descriptor for a new, previously unknown code pattern can be added to the database "at runtime" in order to improve the chance that yet newer variants will be easily detected thereupon. Such additions can further be reported back for inclusion into the next all-customers update.

In various embodiments, low memory footprint, high match lookup performance, and the ability to start match lookup on incomplete data is achieved by using a tree-based lookup algorithm and database. No state or context, other than pending match lookup paths in the database tree, need to be kept about previous findings in the currently scanned code "stream".

In various embodiments, the detection for a known code pattern is called a "Structural Code Pattern Descriptor" (SCPD). For example, given a malicious script code sample where an obfuscation method has been used (e.g. the payload is encoded, and a decoder loop is attached), an SCPD can be created that describes the decoder loop algorithm. This SCPD will then match all malicious scripts that use the same, or nearly the same, decoder loop algorithm.

Likewise, an SCPD describing exploitation of a known vulnerability can match future variants exploiting the very same vulnerability. In various embodiments, an SCPD is stored as a combination of respective root nodes and child nodes in a detection database tree.

Embodiments described herein include methods that are different to, and better than, a simple rule list-based approach for categorizing known malicious behaviour. The embodiments are faster due to its tree-based nature and because various embodiments check only the (irreversible) checksums rather than full function names. Therefore, the various embodiments described herein fully support streaming as no contextual state list needs to be kept about all the previous findings; and provide more proactively as in that various embodiments of the methods do not match against an exact parameter, but rather, against a parameter's entropy; and still provide better protects against false-positives, as the inclusion of process flow and algorithmic operations into the detection improve the match accuracy (without losing diffuseness where needed, that is, for the actual parameter values).

FIG. 1 illustrates a computer network 100 according to various embodiments. Computer network 100 includes a protected portion 114 coupled to an external portion 116. The protected portion 114 is considered to be protected in that the various embodiments of the systems and methods described herein are used to detect malicious code patterns, also referred to as malicious code, in files entering into, or residing on, protected portion 114. External portion 116 includes any devices, networks, or other computer network resources coupled to computer network 100 but that are not part of the protected portion 114 of computer network 100.

In various embodiments, protected portion 114 includes a gateway 120, although the embodiments are not limited to including a gateway. Gateway 120 is coupled to external portion 116 though an interconnect 112 to a network 110. Network 110 is not limited to any particular type or any given number of networks. In various embodiments, network 110 includes the Internet. In various embodiments, external portion 116 includes one or more external devices 108, such as but not limited to one or more external servers 102A-N. In various embodiments, external devices 108 includes at least one malicious server 104. As used herein, a malicious server includes any device, or any other source coupled to a server, that attempts to provide malicious code, or files that include malicious code, to the protected portion 114.

Devices 154 represent any number of devices 152A-N, such as but not limited to computer and servers, as illustrated by dotted line 152C, that are coupled to and protected within protected portion 114 of computer network 100. In various embodiments, devices 152A-N are coupled by one or more networks 150, which also couples devices 152A-N to gateway 120 through connection 142. In various embodiments, gateway 120 couples the plurality of devices 152A-N to network 110. The plurality of devices 152A-N are not limited to any number or types of devices, and can include any devices, such as but not limited to computers, servers, and databases that are coupled to an external network through gateway 120.

Devices 152A-N are referred to as being "protected" because these devices are the devices configured to receive the anti-malware protection provided by gateway 120. In various embodiments, anti-malware protection includes detection of malicious code in any files that are intended to be sent into protected portion 114 of computer network 100. In various embodiments, anti-malware protection includes detection of malicious code in any files that are generated, sent from, or that reside on any of the plurality of devices 152A-N within protected portion 114 of computer network 100.

In various embodiments, gateway 120 includes an anti-malware engine 122. In various embodiments, anti-malware engine is operable to provide malicious code detection. In various embodiments, malicious code detection includes use of methods including comparisons using tree structures of one or more Structural Code Pattern Descriptors (SCPDs). In various embodiments, one or more configuration settings are stored in configurations 130, which is coupled to anti-malware engine 122. In various embodiments, configurations 130 is operable to store one or more configuration settings used by anti-malware engine 122 in the detection of malicious code, as further described herein. In various embodiments, configurations 130 stores one or more threshold values used in the malicious code detection processes, as further described herein.

In various embodiments, an interconnect 129 provides communications within gateway 120. In various embodiments, an interface 140 is coupled to interconnect 129 and is operable to allow a user to interface with gateway 120, including communication of inputs and outputs made between gateway 120 and interface 140. In various embodiments, interface 140 is operable to allow a user to review and to modify one or more of the configuration settings stored in configurations 130. In various embodiments, interface 140 is operable to provide information to a user concerning whether or not malicious code has been detected in a file entering into, or resident within, protected portion 114 of computer network 100. In various embodiments, when malicious code has been detected within a file entering into or resident on protected portion 114 of computer network 100, interface 140 is operable to provide a user with a single indication, or some combination of information, warning messages, and reports that are generated by anti-malware engine 122 as a result of the detection of malicious code.

In various embodiments, interface 140 includes memory 141 operable to store machine readable instructions that, when read and executed on a computer or by a processor, such as but not limited to anti-malware engine 122, or on a computer or processor included in interface 140, executes the functions described herein related to the detection and reporting of malicious code.

In various embodiments, database 144 is coupled to interconnect 129 and is communicatively coupled to anti-malware engine 122. In various embodiments, database 144 is operable to store any combination of tree structures including one or more Structured Code Pattern Descriptors.

In various embodiments, anti-malware engine 122 is coupled to comparison module 123. In various embodiments, comparison module 123 is operable to access one or more instances of tree structures for use in comparative searches being performed on an arbitrary file being checked to see if the arbitrary file includes malicious code. In various embodiments, comparison module 123 is operable to provide an output indicating whether or not an arbitrary file being checked for malicious code is determined to have or include malicious code. In various embodiments, the comparison module 123 provides one or more of the output indications described herein related to whether or not a particular arbitrary file includes malicious code. In various embodiments, any newly discovered malicious code can be processed and provided and stored in database 144 as modifications to existing tree structures, or as additional tree structures, or both.

In various embodiments, newly discovered malicious code is provided as a result of anti-malware engine 122 determining that an arbitrary file includes malicious code. In various embodiments, newly discovered malicious code is detected by some other anti-malware detection system or systems (not shown in FIG. 1) outside protected portion 114 of computer network 100. In various embodiments, anti-malware detection systems outside protected portion 114 will provide the newly discovered malicious code to anti-malware engine 122 for processing as described herein, and for adding the processed results to database 144 for storage and later retrieval and use in detecting malicious code.

In this way, protected portion 114 is operable to automatically update its own database 144 as new malicious code is discovered, either at gateway 120, or from external sources. In various embodiments, database 144 is operable to be used to provide information about newly discovered malicious code detection to other anti-malware detection systems.

It would be understood that anti-malware engine 122 and the malicious code detection provided is not limited to being resident as part of a gateway. The malicious code detection can be provided in a variety of computing environments, including but not limited to network gateways, desktop computers, servers, back-end analysis systems, and within mobile communication devices such as cell phones and Personal Digital Assistants (PDAs). Malicious code detection can be applied anywhere where a device or a system is potentially exposed to malicious code.

Figure 2:
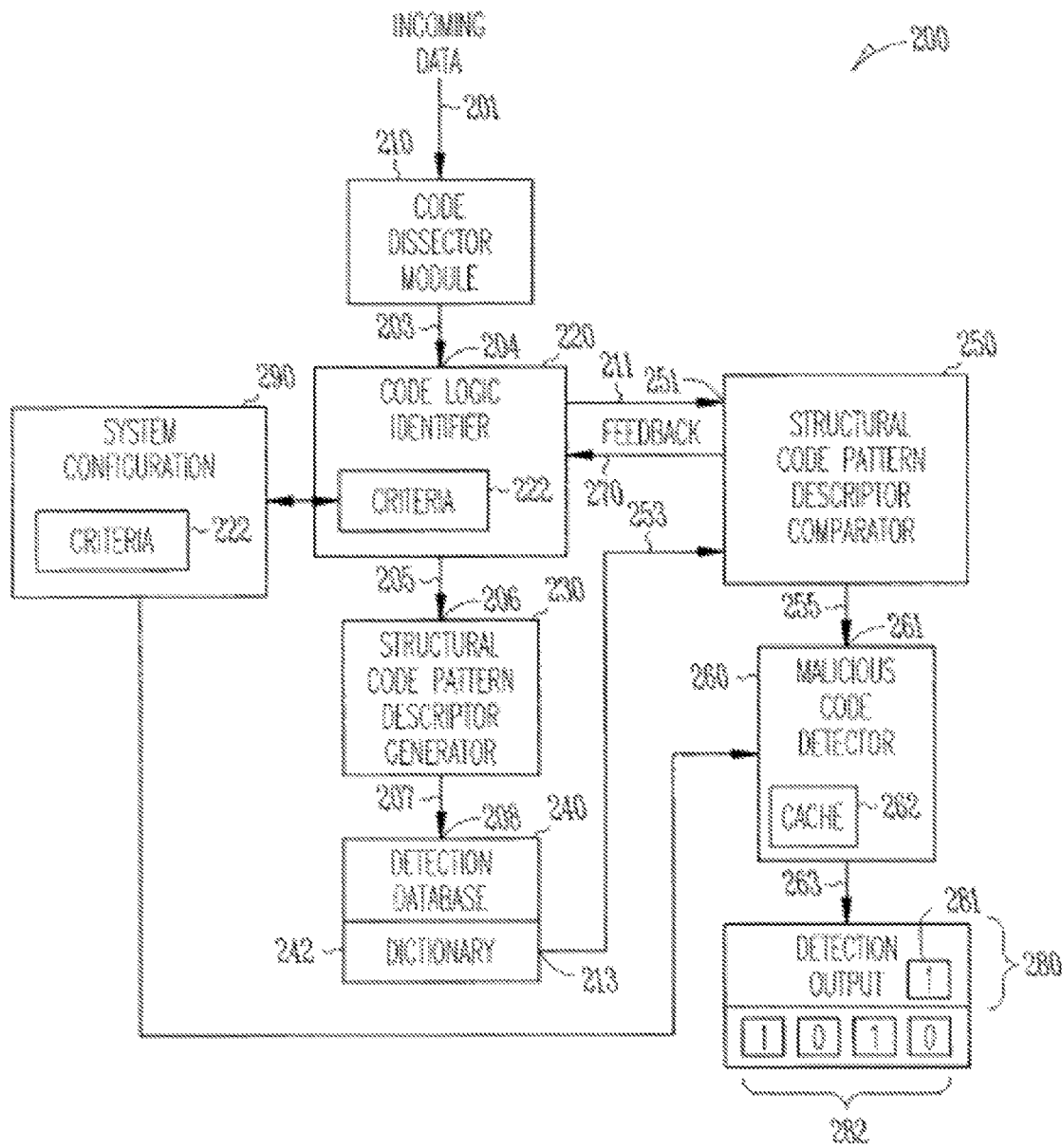
FIG. 2 illustrates a functional block diagram of an apparatus for recognition of malicious code patterns.

FIG. 2 illustrates a functional block diagram 200 of an apparatus for recognition of malicious code. In various embodiments, one or more functional blocks included in diagram 200 are comprised of hardware, software, or firmware, or some combination of hardware, software, and firmware that function as one or more particular machines to perform the functions, and to provide the features of, the various embodiments described herein, and any equivalent functions and features thereof.

As shown in FIG. 2, in various embodiments, a code dissector module 210 is coupled to an input 201, and is operable to receive at input 201 incoming data that is associated with one or more input files or input code. In various embodiments, the input file or input code is the arbitrary file referred to herein. In various embodiments, the incoming data includes an input file or input code provide at input 201 for the purpose of compiling a detection database, as further described herein.

In various embodiments, the incoming data includes an input file or input code provided at input 201 for the purpose of comparing the incoming data to one or more Structural Code Pattern Descriptors to determine if the input file or input code includes, or is likely to include, malicious code, as further described herein.

In various embodiments, code dissector module 210 includes an output 203 coupled to an input 204 of a code logic identifier 220. Code logic identifier 220 includes an output 205 coupled to an input 206 of a structural code pattern descriptor generator 230. Structural code pattern descriptor generator 230 includes an output 207 that is coupled to an input 208 of a detection database 240. In various embodiments, detection database 240 includes data representative of one or more tree structures of descriptor parts. In various embodiments, the one or more tree structures includes one or more paths forming Structural Code Pattern Descriptors, as further described herein.

In various embodiments, detection database includes a dictionary 242. In various embodiments, dictionary 242 is operable to store one or more string variables. In various embodiments, the dictionary 242 also contains a dictionary that maps a one or more particular paths through a tree structure into malware names. By way of illustration, a mapping "1.1.3.2.1.1.3" is matched to "JS.SimpleDecoder.A". The ASN.1 OID-style notation ("1.1.3.2 . . . ") is used here for illustrative reasons. In various embodiments, an actual implementation should associate a unique value with each node in a tree structure, such as its offset into the database, and the lookup algorithm using the detection database and the tree structure would need to know only about this unique value to continue the lookup at this match path.

In various embodiments, code logic identifier 220 includes an output 211 coupled to input 251 of a structural code pattern descriptor comparator 250. In various embodiments, detection database 240 includes and output 213 coupled to a second input 253 of the structural code pattern descriptor comparator 250. Structural code pattern descriptor comparator 250 includes an output 255 coupled to input 261 of a malicious code detector 260. Malicious code detector 260 includes an output 263. In various embodiments, structural code pattern descriptor comparator 250 is operable to compare one or more outputs provided by code logic identifier 220 to the one or more tree structures of descriptor parts stored in detection database 240, and to provide some type of output at output 255 based on the comparison.

In various embodiments, malicious code detector 260 is operable to receive, at input 261, output signals or output data from the structural code pattern descriptor comparator 250, and based on the received output signals or output data, to generate an output signal or output data at output 263, the output signal or data including an indication of whether or not malicious code has been detected in one or more of the incoming files received at input 201. The output signal or output data is not limited to any particular type of signal or data, and can be any signal or any data that includes an indication of whether or not detection of malicious code has occurred for one or more portions of the incoming data provided at input 201 in functional block diagram 200. In various embodiments, the output provided at output 263 includes a single data output, such as a single data bit, indicating whether or not malicious code has been detected, or indicating that the input data received at input 201 is likely to be malicious code. In various embodiments, the output signal includes, but is not limited to, a single data bit or a plurality of data bits set to values based on the output data, that are stored in one or more memory devices, such as but not limited to one or more memory registers 281, 282 of a detection output module 280.

In various embodiments, the data output includes a memory register 281 having a single data bit set to a value indicating whether or not the input file or input code provided at input 201 includes, or is likely to include, malicious code. In various embodiments, the single data bit stored at memory register 281 is set (or in some embodiments—cleared) to a first value, such as but not limited to a value of "1" if a input file or input code is determined to (or in some embodiments is determined to likely) include malicious code, and is set (or in some embodiments—cleared) to a second value, for example but not limited to a value of "0" (zero) if a file is determined not to include (or is not likely to include based on some threshold value), malicious code. In various embodiments, a plurality of data bits 282 is provided to detection output module 280 and include a value, such as a probability, that indicate to what degree or likelihood of certainty the code received at input 201 is malicious code. In various embodiments, the plurality of data bits are provided to memory register 282 and include a value, such as a probability, associated with the status of the setting of the data bit stored in memory register 281. In various embodiments, a matching descriptor part can set an arbitrarily named set of data bits, such as a probability or counter, and other descriptor parts can query the same arbitrarily named sets of data bits.

In one mode of operation, the apparatus of functional block diagram 200 is operable to receive incoming data at input 201, and to operate as, for example but not limited to, a back-end server, that is used to generate a tree structure of descriptor parts related to the incoming data. In various embodiments, the incoming data is known to include malicious code. In such instances, the functional block diagram 200 is operable to process the incoming data with known malicious code for the purpose of generating one or more tree structures of descriptor parts that are indicative of the presence of the malicious code. In various embodiments, input 201 can receive an incoming file from a database, such as but not limited to database 144 as shown in FIG. 1. In various embodiments, the knowledge about the malicious or benign nature of an input file will be translated into a statistic value stored along the descriptor parts generated for the input file.

In various embodiments, the generated one or more tree structures of descriptor parts can be stored in the detection database 240 for later use in comparison to other incoming files or incoming data to determine if the later incoming files or data contain, or are likely to contain, the malicious code, or a variation of the malicious code, that was included in any of original incoming files or data used to generate the one or more tree structures.

In various embodiments of this mode of operation, after receiving incoming data at input 201, code dissector module 210 is operable to parse and normalize the incoming data. Parsing is the dissection of any input files, of parsing through the file, first byte to last, finding the next function call, parameter, process flow statement or likewise, potentially emulating some of the file to make an accurate finding, then delivering the very next finding—the indicator—to the calling module. Normalization is an optional step of translating many different variants, or encoding, of a similar functionality, such as a function call, into one common representation.

While parsing, each parsed data is then output consecutively, one finding at a time, to the code logic identifier 220. The code logic identifier 220 is operable to identify logic entities that are determined to be logic entities that are to go into a tree structure as a Structural Code Pattern Descriptors. In various embodiments, the identification of code logic entities, or parts thereof, is performed by the parser implementation itself. In various embodiments, criteria 222 are used to determine which logic entities are to be processed for inclusion in the tree structure. Criteria 222 are not limited to any particular type or form of criteria. In various embodiments, specific logic entities can be enumerated and stored in the criteria 222 to indicate which logic entities should be processed into one or more tree structures of related Structural Code Pattern Descriptors. In various embodiments, criteria 222 include one or more rules that determine whether or not a particular logic entity should be processed for inclusion in a tree structure. Various embodiments include a combination of different types of criteria for inclusion in criteria 222.

In various embodiments, criteria 222 includes any one, or any combination of, the following types of logic entities designated to be identified and included in a tree structure of descriptor parts used to form one or more Structural Code Pattern Descriptors:

process flow statements, like the start or the end of an iteration statement (for or while loop);
host application API calls or calls to user-defined functions or other code branches;
definition or modification of variables (string concatenation, bitwise shifting, etc.); and
variables passed along with any API or function call,
the detected boundary between two logically separated code blocks.

Additional descriptor parts, which are not necessarily generated by a parser, but that can still be used in various embodiments to form one or more Structural Code Pattern Descriptors include:

a signature string to scan for in the input file,
an arithmetic operation or comparison against parts of the input file, against data dissected thereof, or against variables created for the lifetime of scanning the input file, or parts thereof, and the variables created by and/or accessible to this and other descriptors in the database tree,
A call to a custom, engine-defined function supplying helper functionality, such as the calculation of information entropy for a given block of data, including the ability to pass information from the input file and current descriptor to the custom function,
A call to a custom, human analyst-defined code snippet stored within any descriptor in the database and written in an engine-defined custom code language, supplying helper functionality or complex classification, including the ability to pass information from the input file and current descriptor to the custom code snippet.
Performing a (arithmetic) comparison against a custom engine-defined property, such as the input file's size, its media type, or any other property calculated from, and describing, the input file.

Once the code logic identifier 220 has identified a logic entity that is to be included in a structural code pattern descriptor, the identified logic entity is output at output 205 to the structural code pattern descriptor generator 230. The structural code pattern descriptor generator 230 performs one or more operations on the received logic entity in order to generate, in some embodiments, a tree of descriptor parts chain. In various embodiments, the received logic entity is used as a root node forming the beginning descriptor part for one or more descriptor parts chains. In various embodiments, if the received logic entity is determined to be a root node, one or more additional received logic entities provided in the input file or input code can then be used to continue to build a descriptor parts chain by coupling one or more of the additional received logic entities, in a sequential order, to the logic entity determined to be a root node in order to form a descriptor parts chain having the received logic entity as the root node.

In some embodiments, a descriptor parts chain includes exactly one child node and one root node. In some embodiments, a descriptor parts chain includes at least one root node and a plurality of child nodes. In various embodiments, the order of the descriptor parts in a descriptor parts chain resembles the original order of the logic entities as present in the dissected input code. In various embodiments, each descriptor parts chain ends in a child node, referred to as a terminal node, having no further child nodes proceeding from the terminal node.

There is no fixed limit to the number of child nodes that can be included in a descriptor parts chain proceeding from a given root node. While generating a database, the code logic identifier 220 and the structural code pattern descriptor generator 230 can make heuristic decisions on stopping at any node depth based on data context, memory footprint or performance requirements, or anything else. In various embodiments, the heuristics used in these decisions are stored, for example in criteria 222, and provided by system configuration 290. In various embodiments, a portion of a tree of descriptor parts is, for example, structured like:

```
ROOT NODE
    Media Type INDICATOR
        INDICATOR (Call, Param, ...)
            INDICATOR
            ...
            INDICATOR
            ...
            Media Type INDICATOR ]
```

In various embodiments, the tree structure of descriptor parts is generated by first identifying a logic entity that is to be included in a descriptor parts chain, and then processing additional logic entities provided by code dissector module 210 and code logic identifier 220 as received at input 210 to determine the relationship between the identified logic entity and the sequence and configuration of child nodes to be used in the descriptor parts chain coupled to the identified logic entity.

Once structural code pattern descriptor generator 230 has generated the tree structure associated with the identified logic, the generated tree structure is provided at output 207 to input 208 of the detection database 240. In various embodiments, the tree structure received at input 208 is stored the database 240. In various embodiments, one or more manually crafted trees are merged with one or more generated trees, producing one resulting combined tree. One or more of the stored tree structures in database 240 are available for retrieval at a later time for use in comparison to other incoming data files to determine if the other incoming data files include malicious code based on a one or more of the stored tree structures in database 240.

In various embodiments, the one or more stored tree structures can have individual names or numbering that uniquely identifies a given descriptor parts chain within detection database 240. In various embodiments, one or more same child nodes can be included in one or more descriptor parts chains that originate from different root nodes, or that originate from a same root node but that end in different terminal nodes, or both. Therefore, in various embodiments, a given child node can be included in one more different descriptor parts chains that have different names or numbers identifying the descriptor parts chains in which the child node is included.

In another mode of operation, referred to in various embodiments as the comparison mode, the apparatus of functional block diagram 200 is operable to receiving incoming data at input 201, and to generate an output indicative of whether or not the incoming data includes, or is likely to include, malicious code. In various embodiments of this mode of operation, it is not known whether or not the incoming file or data does or does not include malicious code, or is likely to include malicious code. In such instances, the incoming file or data is processed through functional block diagram 200 to determine, based on an output provided at detection output 263, if the incoming file includes malicious code, or is likely to include malicious code.

In the comparison mode, the incoming data is received at input 201, and is parsed and normalized at code dissector module 210 as described above. As described above, the dissected logic entities from the incoming data are provided, one at a time, to the code logic identifier 220. Based on the criteria 222, code logic identifier 220 is operable to determine when a logic entity received at input 204 needs to be compared for possible match with a tree structure having one or more Structural Code Pattern Descriptors, or if the logic entity can be ignored. If code logic identifier 220 determines that the logic entity can be ignored, the logic entity is disregarded, and the next logic entity received at input 204, if any, is processed.

If code logic identifier 220 determines, in various embodiments based on criteria 222, that the logic entities received at input 204 needs to be processed to see if the logic entity is, or is likely to be associated with malicious code, code logic identifier 220 is operable to provide the identified logic entity at output 211 to the structural code pattern descriptor comparator 250 at input 251. Structural code pattern descriptor comparator 250 is operable to access one or more tree structures stored in the detection database 240 and provided from output 213, to be received at input 253 of the structural code pattern descriptor comparator 250. Structural code pattern descriptor comparator 250 is operable to compare the received logic entity to the root nodes in any of the tree structures retrieved from detection database 240, and to determine if a match exists, either full or partial, for any path from any of the root node included in the tree structure.

In various embodiments, finding a match for a compared logic entity includes further processing additional input received at input 201 to determine if the code patterns being received at input 201 following or logically related to the identified logic entity corresponds with any of the descriptor parts chains coupled with the root node matching the logic entity that initiated the comparison. In various embodiments, once the code logic identifier 220 identifies a particular logic entity that is to be sent to the structural code pattern descriptor comparator 250 for comparison, the code logic identifier 220 can continue to process and forward additional logic entity received from the input file in order to allow structural code pattern descriptor comparator 250 to continue to compare the received logic entities to the tree structures in detection database 240 until the chain of provided logic entities either results in determination that a match exists, or that the provided sequence of logic entities does not result in a match with any of the tree structures being use in the comparison.

In various embodiments, structural code pattern descriptor comparator 250 is operable to provide information through feedback 270 to code logic identifier 220, to indicate, for example, that the sequence of logic entities being provided and associated with an initial particular logic entity is matching a chain in the tree structure, and therefore to continue to send additional logic entities from the input data. In various embodiments, feedback 270 can be used to indicate that for a given logic entity provided to structural code pattern descriptor comparator 250, the comparison process has not resulted in a match. In various embodiments, in such instances, if code logic identifier 220 is not also providing a sequence of logic entities associated with a different initial logic entity, the code logic identifier 220 will discontinue providing sequential logic entities to the structural code pattern descriptor comparator 250 until either the end of the input data is reached, or another logic entity is located that is deemed to be a logic entity that needs to be processed by the structural code pattern descriptor comparator 250.

In various embodiments, as logic entities are being provided to the structural code pattern descriptor comparator 250, the code logic identifier 220 can receive and identify another logic entity that is also determined to be a potential start of a new logic sequence that might be malicious code. In various embodiments, the code logic identifier 220 is operable to provide this new logic entity to the structural code pattern descriptor comparator 250 with additional information indicating that this newly identified logic entity is potentially the start of another and different sequence of malicious code. In various embodiments, the structural code pattern descriptor comparator 250 is operable to process a second, or third, or more additional chains of logic entities, and to individually keep track of the comparisons of these sequences of logic entities as provided by the code logic identifier 220 in order to individually determine with each of the chains, on an individual basis, if each sequence is or is not determined to be malicious code. In various embodiments, the structural code pattern descriptor 250 is operable to provide individual outputs for more than one sequence of logic entities indicating, for each of the individual sequences of logic entities, a status, and in some embodiments, a value associated with the status. In various embodiments, these outputs are stored in cache 262 in malicious code detector 260 for additional processing, as described herein.

In various embodiments, if a match between a logic entity and associated code and a given one of the descriptor parts chain from the tree structures stored in database 240 is detected, structural code pattern descriptor comparator 250 is operable to provide an output at output 255 to malicious code detector 260 at input 261 indicating that a match has been detected. In various embodiments, if a match is not detected by comparator 250 for the logic entity provided after adequate further processing of the input data related to the logic entity, comparator 250 does not provide an output to malicious code detector 260.

In various embodiments, malicious code detector 260 is operable to store the output from comparator 250 in a memory, such as a cache 262. In various embodiments, malicious code detector 260 is operable to receive from system configuration 290 one or more system configuration settings that control the detection output of malicious code detector 260.

In various embodiments, the system is configured to merely provide an indication that a match has been detected in the incoming data received at input 201, and as soon as comparator 250 provides such an indication to detector malicious code detector 260 will provide at output 263 an indication that malicious code has been detected, or is likely to be included in, the incoming data received at input 201.

In various embodiments, the system is operable to utilize cache 262 to store each one or more indications of a match provided to malicious code detector 260 for a given set of input data. After all of the incoming data to be compared has been received and processed, malicious code detector 260 is operable to provide an output at 263 based on the results stored in cache 262 of the entire set of data received at input 201. In some embodiments, malicious code detector 260, after receiving an indication that all incoming data has been processed, reviews the matches stored in cache 262, and determines how the matches, if any, are to be reported out at output 263. In various embodiments, the format for the report is determined using one or more of the setting provided by the system configuration 290.

In various embodiments, malicious code detector 260 is operable to calculate which of the stored matches has the highest overall match probability, as further described herein, and to provide at output 263 an indication of the match having the highest overall match probability. In various embodiments, the report out includes set a single bit to a value indicative of where or not any of the matches indicate that malicious code is, or is likely to exist, in the incoming data associated with the comparison preformed. In various embodiments, detector 269 is operable to report out all the matches stored in cache 262 related to the comparison of the incoming data included in the comparison.

Figure 3:
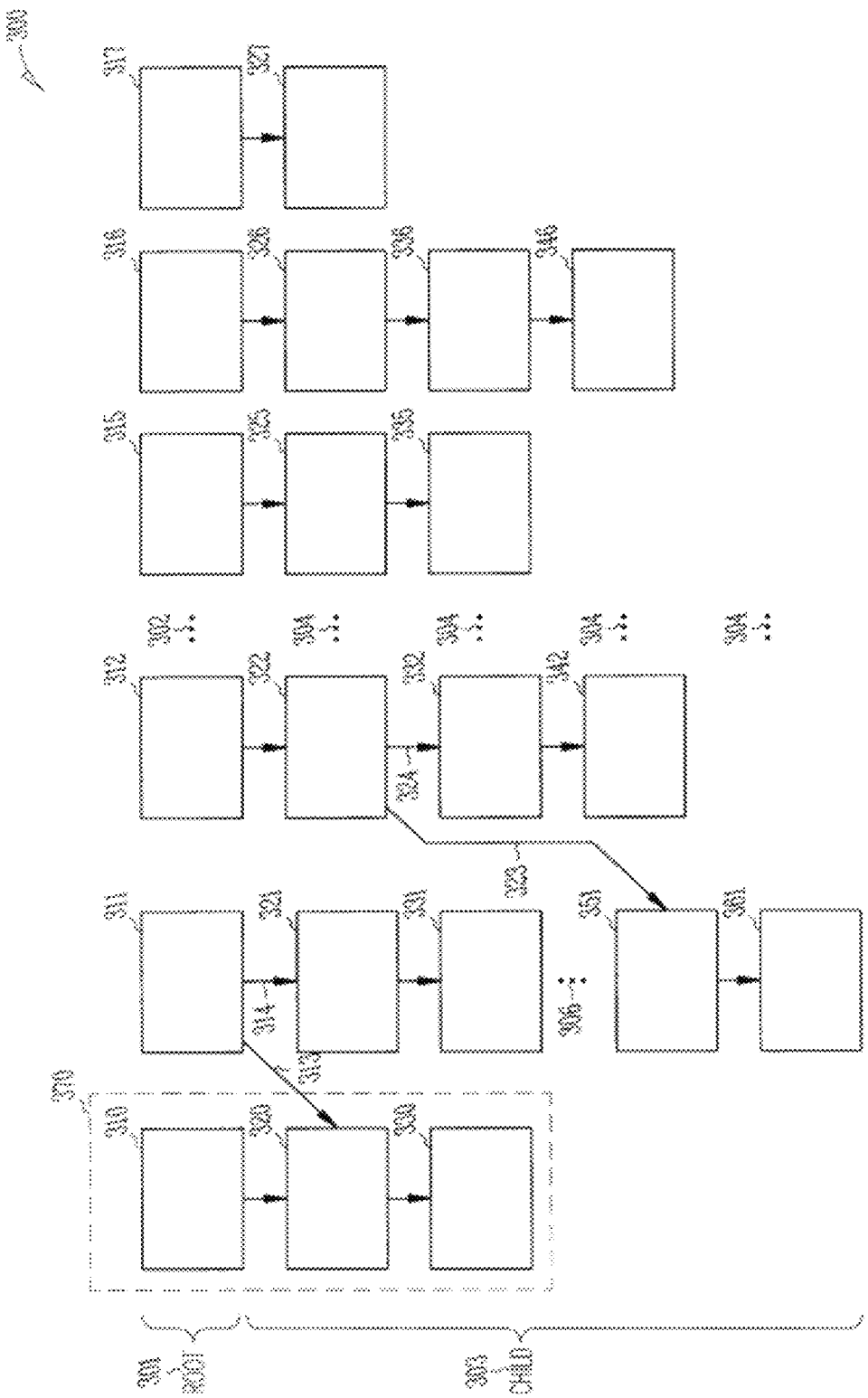
FIG. 3 illustrates a tree structure of descriptor parts according to various embodiments.

FIG. 3 illustrates a tree structure 300 of descriptor parts. Tree structure 300 is intended to be illustrative of the various embodiments of tree structures that can be used in the various embodiments described herein. In various embodiments, tree structure 300 is stored in a detection database, such as database 144 of FIG. 1, or the detection database 240 of FIG. 2 in the application.

Referring again to FIG. 3, tree structure 300 includes a plurality of descriptor parts 310-312, 315-317, 320-322, 325-327, 330-332, 335-336, 342, 346, 351, and 361, arranged in tree structure 300. In various embodiments, tree structure 300 includes one or descriptor parts, referred to a root nodes, as shown by descriptor parts 310-312 and 315-317, as included in row 301 of tree structure 300. The number of root descriptor parts included in row 301 is not limited to any particular number of descriptor parts, as indicated by dotted line 302.

In various embodiments, each of the root node descriptor parts 310-312 and 315-317 are linked to at least one other node, referred to as a child node, in one or more rows 303. By way of illustration, root node 310 is linked to child node 320; root node 311 is linked to child node 321; root node 312 is linked to child node 322; root node 315 is linked to child node 325; root node 316 is linked to child node 326; and root node 317 is linked to child node 327.

In various embodiments, a given root node and any child node or nodes linked to the root node provide a chain of descriptor parts associated with the root node. In various embodiments, a given chain includes a root node linked to a single and only one child node. By way of illustration, root node 317 is linked to a single and only one child node, the child node represented by child node 327.

In various embodiments, a given root node can be linked to a serially connected set of child nodes. By way of illustration, root node 315 is linked to a child node 325, which in turn is linked to a child node 335. The number of child nodes linked serially to a given root node is not limited to a particular number of child nodes, and can be any number of child nodes linked serially together. This is illustrated in tree structure 300 by root node 311 linked to child node 321, which in turn is linked to child node 331, which is linked to additional child nodes, as represented by dotted line 306 linking child node 331 to child node 351, which in turn is linked to child node 361.

In various embodiments, one or more of the chains within tree structure 300 have a same number of child nodes linked to the root nodes for each of the chains. In various embodiments, at least one chain within tree structure 300 has a number of child nodes linked serially that is different from the number of child nodes linked to at least one other chain in tree structure 300. When talking about comparisons using chains of descriptor parts, it is to be understood that this shall not imply any need for a full match of all the descriptor parts in a given chain in order to produce an overall (probabilistic) match.

In various embodiments, a root node can be linked to more than one child node. By way of illustration, root node 311 is linked by a first link represented by arrow 313 to child node 320, and by a second link represented by arrow 314 to child node 321. The first link 313 and the second link 314 represent two different paths that can be taken from root node 311. The first path includes root node 311 and child node 320, and then continues with any child nodes linked to child node 320 only. The second path includes root node 311 and child node 321, and then continues with any child nodes linked to child node 321 only.

In various embodiments, a child node can be linked to more than one other child node. By way of illustration, child node 322 is linked by a first link represented by arrow 323 to child node 351, and is linked by a second link represented by arrow 324 to child node 332. The first link and the second link create two different and separate paths leading from child node 322.

In various embodiments, the links only couple nodes in one direction. For example, link 324 couples node 322 to node 332, which is the direction of the movement during a comparison to move through the chain. In various embodiments, the comparison would not go back to node 322 from node 332. Therefore, once arriving at a given node, the process does not care, and does not track, the node taken to arrive at the given node. In other embodiments, the path is tracked, for example in chains for a given node can be arrived at from more than one chain, in order to determine specifically which path, and therefore which associated malicious code, is represented by the given path.

In various embodiments, a given path of descriptor parts within tree structure 300 starts at a root node, and follows the link, or one of the links if more than one exists for a given root node, to a first serially linked child node. By way of illustration, starting at root node 310, a path is formed by the link between root node 310 and 320. From the first serially link child node, the path can only proceed to another lower level child node linked to the first serially linked child node. If no lower level child nodes are linked to the first serially linked child, the child node is considered to be terminal node. However, in this illustration, child node 320 is linked to a lower level child node, node 330. Therefore, the path illustrated by the dashed box enclosing tree lookup path 370 continues from child node 320 to child node 330. Since no lower level nodes are linked to child node 330, child node 330 is a terminal child node.

In various embodiments, if during a comparison process using a given path within tree structure 300, the comparison arrives at a terminal child node, the comparison is considered to have found a potential match between the data being compared and the path within tree structure 300 being used in the comparison. Based on probabilistic computation, such a match can also be reached already before reaching any terminating child nodes in the tree (leaf nodes). In various embodiments, such a match indicates that the data being compared includes, or is likely to include, the malicious code, or a variation thereof, associated with the path within tree structure 300 that was used generate the particular path used in the comparison.

In various embodiments, the tree structure 300, along with any generated data associated with tree structure 300 such as but not limited to weights for each of the part descriptors included in tree structure 300, is stored in a database for later use in comparison with incoming data for the purpose of determining if malicious code, or the likelihood that malicious code is present, in the incoming data.

In operation, in various embodiments the tree structure 300 is used to compare logic entities identified in incoming data to paths within tree structure 300. In various embodiments, within an incoming file or some part of an incoming file, a given logic entity within the incoming file is identified that matches a root node in tree structure 300. Starting at the matched root node, the next part descriptor dissected from the incoming data is compared to see if it matches the next child node, or at least one of one node, that is serially linked as a next node linked to the original matching root node.

If there is a match, the comparison (additionally) continues from the matching child node with a comparison of the part descriptor following the last compared part descriptor in the incoming data to the next lower level child node serially connected to the last matching child node. In various embodiments, a mismatch between any of the next lower level child nodes and the next one or more incoming data is ignored until a certain threshold, based on probabilistic assessment of the pending lookup, is reached. Again, if a match is found, the comparison process continues in a like matter, from the now matched lower level child node, and comparing the next following part descriptor in the incoming data to the next lower level serially connected child node in the path linked to the original root node. If a match is determined to exist in a terminal child node linked to the originally matching root node of the chain, an indication that a match has been detected is generated. Based on probabilistic assessment, such a match may also be reached earlier in the comparison process before the terminal node was reached.

In the alternative, if the next part descriptor in the incoming data does not match the next, or any, lower level child node serially connected to the matching root node, in some embodiments a determination that no match exists is made. In various embodiments, a comparator, such as the structural code pattern descriptor comparator 250 of FIG. 2, is used to perform the comparison between the incoming file (or some part of the incoming file) and the tree structure 300.

In various embodiments, a tracking of the path from the root node that resulted in arriving during a comparison at any given child node is not maintained. In such embodiments, all that is tracked is whether the sequence of additional logic entities received as part of the comparison being performed result in reaching a terminal child node in any descriptor parts chains in the tree structure 300. In various embodiments, a probability weighting is calculated and tracked for a comparison based on the path used to arrive at a given child node, including a root node, as part of a comparison. In such embodiments, as the comparison proceeds, the cumulative probability weighting for the comparison currently calculated for arriving at any given node is compared to a threshold value, and if the calculated probability weighting exceeds the threshold value, a determination is made that the comparison has resulted in detection of malicious code. In various embodiments, the determination related to a given comparison initiated at a root node is made only if the comparison reaches a terminal child node in tree structure 300. In various embodiments, the determination is made if the calculated probability exceeds a threshold value even if the given comparison initiated at a root node has not reached a terminal child node in the tree structure 300.

In various embodiments, an output indicating that a match was or was not detected is provided by the comparator as a result of comparing the incoming file, or some part of the incoming file, with tree structure 300. In various embodiments, the output includes a single Boolean flag set to a particular status (yes or no, true or false, one or zero) to indicate whether or not a match was determined to exist between the incoming file (or some part of the incoming file) and the tree structure.

By way of illustration, if a match is determined to exist between the incoming data and the tree structure 300, the Boolean flag is set to a value of "1" (one), and if it is determined that no match exists between the incoming file and tree structure 300, or between some part of the incoming file and tree structure 300, the bit is set to or cleared to a value of "0" (zero). In various embodiments, a match probability (0% . . . 100%) is returned in addition to, or as an alternative to the output associated with the Boolean flag. In various embodiments, the output includes a descriptive malware name label describing the nature, or source, or other characteristic or history of the malicious code finding that generated the positive indication being returned.

In various embodiments, a match of a part descriptor to a root node or to a child node requires an exact match. The requirement for an exact match between part descriptors and nodes is required throughout the entire chain starting at the root node until at least one terminal child node is reached, in order to determining that a match exists. In various embodiments, a probability and/or weighting is determined for any chain were a match is found in the incoming file to a root node in the tree structure 300. Starting at the root node, a weighting is assigned to each matching node in the chain until the last match in the chain linked to the originally matching root node is located.

In various embodiments, each descriptor part is assigned a weighting per part type, value type, and value. By way of illustration, each descriptor part has a part type that can be assigned a particular weighting for the descriptor part. In various embodiments, an exact match between a descriptor part and a node is not required, and a fuzzy match between a descriptor part and a node can be accepted, adjusted or disregarded based on the weighting for the descriptor part.

In various embodiments, two descriptor parts match if their part types match, and if their value types match and if their values match. In various embodiments, two descriptor parts match if their part types match, their value types match and if the entropy values assigned to the respective values match within a configurable tolerance threshold. In various embodiments, a configurable tolerance threshold is plus or minus 0.1. This if the stored entropy value assigned to two values for two different description parts being compared to one and other fall within, or in some embodiments fall within or is equal to, a configured tolerance threshold, the two descriptor parts are considered to be a match.

When applied to a search using the tree structure 300, when comparing a logic entity to a given node in tree structure 300, the logic entity is determined to be a match for the given node if, in some embodiments, the logic entity has a part type that matches the part type of the given node, and the value type of the logic entity exactly matches the value type of the given node and the values match exactly or nearly. In various embodiments, when comparing a logic entity to a given node in tree structure 300, the logic entity is determined to be a match for the given node if, in the logic entity has a part type that matched the part type of the given node, and the value type, and the entropy value for the value of the logic entity is within a tolerance threshold of the value for the given node.

In various embodiments, a determination as to whether a match requires an exact match of the value, or whether a match requires that the logic value be within the tolerance threshold, is configurable as part of the system configuration for tree structure 300. In various embodiments, the choice of these configuration can be made on a node by node basis, wherein one or more nodes on the system are configured to require an exact match, and one or more nodes within a tree structure are configured to require a match based on the tolerance threshold.

In various embodiments, matching any two descriptor parts (that is, a descriptor part and a descriptor part associated with a node in tree structure 300) generates a match probability. In various embodiments, an overall match probability is generated for each of the match probabilities generated in a given tree lookup path. By way of illustration, a set of logic entities received in an incoming file are compared to and determined to match a given tree lookup path 370, represented in FIG. 3 by the dashed rectangle surrounding root node 310, child node 320, and terminal child node 330. For each of the nodes in the tree lookup path 370, a match probability is generated for the descriptor part of the incoming file that is compared to the given node 310, 320, or 330 in tree lookup path 370.

Using these three match probabilities, an overall match probability is calculated as the sum of each of the three generated match probabilities for tree lookup path 370 and the incoming file, for example, using Bayes' formula"

Bayes' formula relates the conditional and marginal probabilities of stochastic events A and B:

$$Pr(A \mid B) = \frac{Pr(B \mid A) Pr(A)}{Pr(B)} \propto L(A \mid B) Pr(A)$$

where L(A|B) is the likelihood of A given fixed B. Notice the relationship:

$Pr(B|A)=L(A|B)$.

Each term in Bayes' formula has a conventional name:
Pr(A) is the prior probability or marginal probability of A. It is "prior" in the sense that it does not take into account any information about B.
Pr(A|B) is the conditional probability of A, given B. It is also called the posterior probability because it is derived from or depends upon the specified value of B.
Pr(B|A) is the conditional probability of B given A.
Pr(B) is the prior or marginal probability of B, and acts as a normalizing constant.

As an alternative, or in addition, other statistical methods may be used in computing an individual match probability and/or in computing an overall match probability. Examples include, but are in no means limited to, usage of Markov Models.

The overall probability provides a percentage probability that an arbitrary file contains malicious code—given the file type and/or the location of the finding, its existence usually implies it is malicious code. In various embodiments, the overall probability may consist of a threat, or danger, probability and a classification confidence probability. In various embodiments, a comparison of the overall probability to a threshold value M is made to determine if the arbitrary file includes malicious code. For example, if an overall statistical probability for the arbitrary file equals or exceeds a threshold value M, the arbitrary file is considered to include malicious code.

Figure 4:
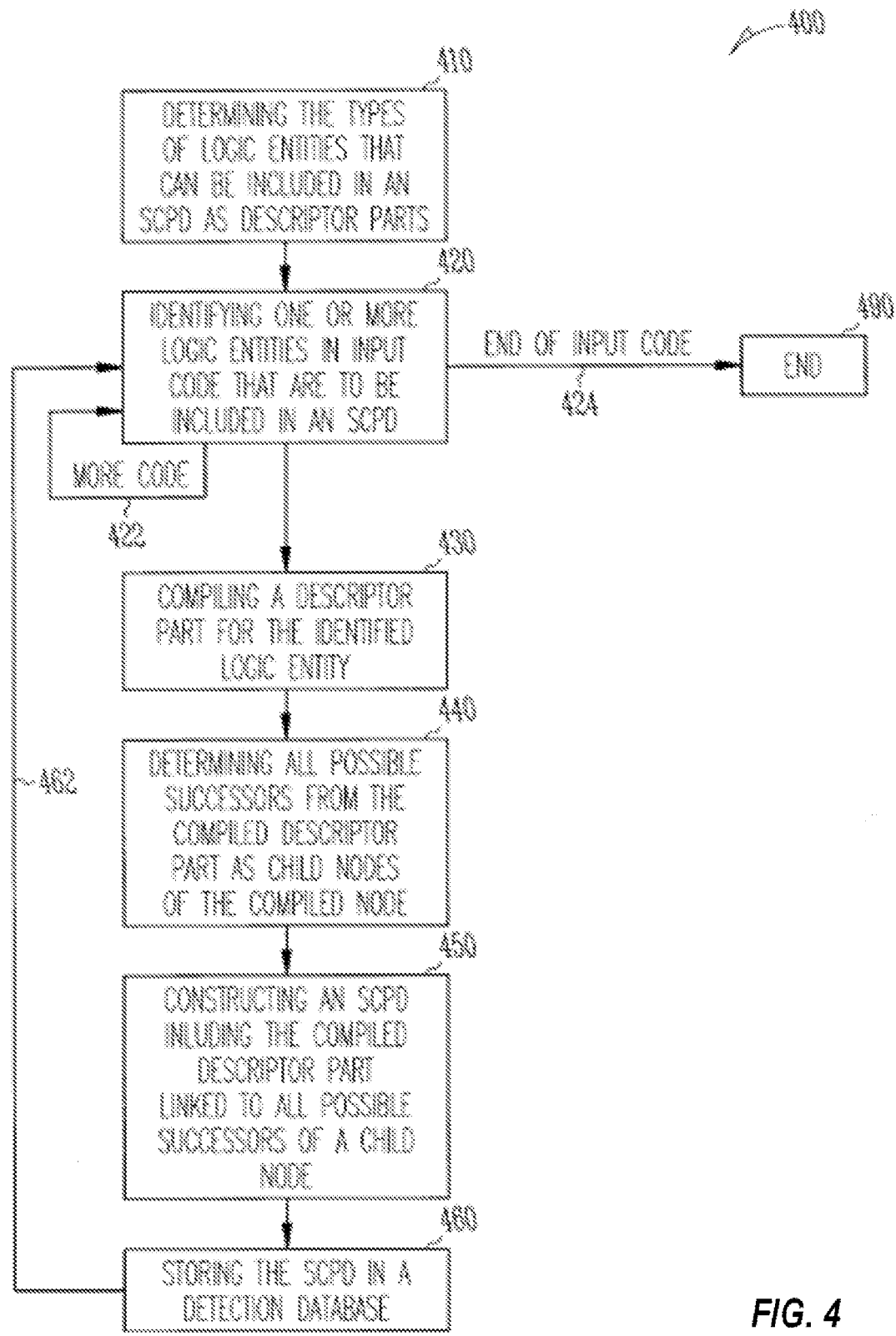
FIG. 4 shows a flowchart for of a method for compiling a detection database including a tree structure of descriptor parts according to various embodiments.

FIG. 4 shows a flowchart for a method 400 for compiling a detection database including a tree structure of descriptor parts.

In various embodiments, compiling a detection database includes at 410 determining the types of logic entities that can be included in a Structural Code Pattern Descriptor (SCPD). The logic entities that can be included in a Structural Code Pattern Descriptor are not limited to any particular type of logic entity, and can be any logic entity chosen to be included in a Structural Code Pattern Descriptor. The determination as to which logic entities are to be included in any Structural Code Pattern Descriptor generated as part of compiling a detection database can be configured through a set of criteria developed for the system and stored in the system as part of a system configuration.

Examples of logic entities that can be determined to be descriptor parts that can be included in a Structural Code Pattern Descriptor include but are not limited to the following:
  process flow statements, like the start or the end of an iteration statement (for or while loop),
  host application API calls or calls to user-defined functions or other code branches,
  definition or modification of variables (string concatenation, bitwise shifting, etc.), and
  variables passed along with any API or function call.

At 420, method 400 includes identifying logic entities in input code that are to be included in a Structural Code Pattern Descriptor. In various embodiments, the input code includes a complete input file. In various embodiments, the input code includes a selected portion of an input file that includes less code than the code included in the complete file from which a selected portion of code is taken.

In various embodiments, identifying logic entities in the input code including dissecting the input file into individual logic entities, and feeding the individual logic entities, one at a time, to a code logic identifier operable to determine if the individual logic entity received at the code logic identifier is the type of logic entity that should be included in a Structural Code Pattern Descriptor. In various embodiments, the code logic identifier determines whether or not the logic entity should be included in a Structural Code Pattern Descriptor by comparing the logic entity to the set of types of logic entities determined in method 400 at 410 to see of the logic entity is included in the set of types of logic entities that can be included in a Structural Code Pattern Descriptor.

In various embodiments, if the code logic identifier determines that the logic entity is to be included in a Structural Code Pattern Descriptor, the code logic identifier passes the logic entity a module or device, such as a structural code pattern descriptor generation, for further processing.

At 430, method 400 includes compiling a descriptor part for the identified logic entity to generate a compiled descriptor part. In various embodiments, comparing the descriptor part for the identified logic entity including normalization of the logic entity.

Various embodiments include compiling a descriptor part for a process flow statement. Process flow statements include such process flow statements such as while( ) or for( ) iteration statements. In various embodiments, both the start of the loop body (open scope), and its end (close scope), shall be denoted as separate descriptor parts.

Various embodiments include compiling a descriptor part for an API Call. A normalization function maps certain function/API names to normalized values, such as mapping "writeln" to "write". To reduce memory footprint and increase match performance, only the checksum (CRC32, for example) of an API name, and optionally of the number of actual parameters passed along, is stored. Two different API names could lead to the same checksum, e.g. this checksum cannot be used to uniquely identify which input API name and parameters combination was used to create the checksum, thus implying a false-positive risk as the trade-off for improved match performance.

In various embodiments, two subsequent API calls can optionally be stored in just one descriptor part, by Exclusive-OR (XOR) combining their checksums, thereby decreasing memory footprint. Application of Exclusive-OR combination of two successive descriptor parts needs to be stored in the resulting descriptor part.

Various embodiments include compiling a descriptor part for a call to a user-defined function. A call to a user-defined function can either be ignored, or be stored as a descriptor part referring to, for example, the entropy of the code block that implements the referenced function, or to a checksum (such as the Exclusive-OR of each normalized instruction) of a normalized form of the code block (normalized such as removing actual registers or actual immediate values).

Various embodiments include compiling a descriptor part for a variable or a parameter. Various embodiments limit covered variables and parameters to strings and string literals, and in various embodiments, further limit coverage on variables and parameters that exceed a given minimum length (like 30 bytes, at least), and optionally exceed a given minimum entropy, and optionally contain certain characteristic sequences (like NOP slides).

In various embodiments, the length denoted in a descriptor part for a variable or parameter may be shorter than the actual length present in order to facilitate left-side-only matches; in this case, both the entropy and the checksum is calculated (for storage and for comparison) over the length of data as per the length denoted in the descriptor part. For example, one descriptor part could be used to describe both
  "C:\WINDOWS\system32\gdi32.dll"
  and
  "C:\WINDOWS\system32\gdiplus.dll"

By specifying the length in the descriptor part to be 23 bytes (e.g. up to "\gdi"). The alternative would be to use a regular expression descriptor part. The logic entity's information entropy $$H(X) = -\sum_{i=1}^{n} p(x_i) \log_2 p(x_i)$$

is calculated with x={0 . . . 255}, $x_i$=i−1 and n=|x| (as the parameter's or variable's value is a set of 8-bit values).

Various embodiments include compiling a descriptor part for a variable modification. In various embodiments, "characteristic" operations on variables, such as string concatenation operations ("+="), bit-shifting operations or Exclusive-OR operations, are denoted as separate descriptor parts in an SCPD. "Characteristic" refers to those operations that are indicative of belonging to an obfuscation algorithm, buffer overflow creation loop, or similar suspicious activity.

Still referring to FIG. 4, at 440, method 400 includes determining all possible successors from the compiled descriptor part as child nodes of the compiled node.

At 450, method 400 includes constructing a Structural Code Pattern Descriptor including the compiled descriptor part linked to all possible successors of a child nodes.

At 460, method 400 includes storing the Structural Code Pattern Descriptor in a detection database. In various embodiments, after the storing is complete, method 400 returns to 420 to continue to identify logic entities in the input code that are to be include in a Structural Code Pattern Descriptor.

In various embodiments, as the input code is processed, if more code is still present, method 400 continues to process the input code to identify any logic entities that are to be included in a Structural Code Pattern Descriptor, as indicated by arrow 422. If the end of the input code is reached, and all of the logic entities in the input code have been identified, method 400 ends at 490, as represented by arrow 424. At any time, the dissector may emit one or more descriptors that are associated with the input file, any of its structures or characteristics, but not to the dissected code itself.

Figure 5:
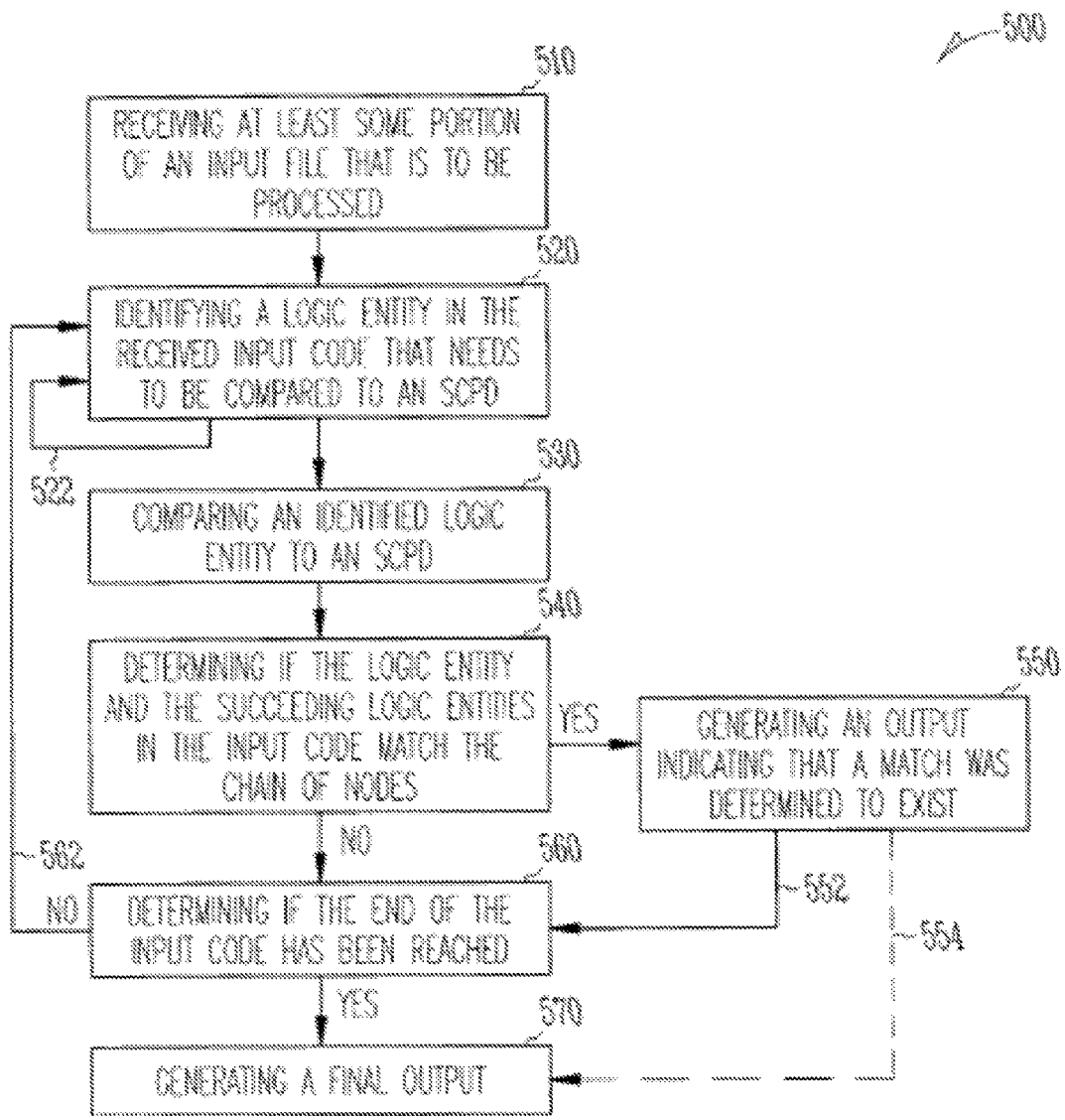
FIG. 5 illustrates a flowchart for a method of comparing input code to one or more Structural Code Pattern Descriptors according to various embodiments.

FIG. 5 illustrates a flowchart for a method 500 of comparing input code to one or more Structural Code Pattern Descriptors.

At 510, method 500 includes receiving at least some portion of an input file that is to be processed. In various embodiments, processing includes performing a comparison of one or more portions of the input code to a tree structure including one or more Structural Code Pattern Descriptors. In various embodiments, the tree structure is stored in a detection database, such as database 144 as shown in FIG. 1, or detection database 240 as shown in FIG. 2. In various emblements, receiving at least some portion of the input file includes receiving at least some portion of the input file after a comparison of an earlier received portion of the input file has already begun.

Referring again to FIG. 5, at 520 method 500 includes identifying a logic entity in the received input code that needs to be compared to a Structural Code Pattern Descriptor. In various embodiments, identifying a logic entity that needs to be compared includes determining if a descriptor part for the logic entity matches any of the descriptor parts included in the root nodes of any Structural Code Pattern Descriptors included in the tree structure being used for the comparison.

In various embodiments, if the descriptor part of the logic entity from the input code matches any of the root nodes from the tree structure being used for the comparison, method 500 progresses to 530. If the logic entity received in the input code is not a type of logic entity that is to be compared to a Structural Code Pattern Descriptor, method 500 continues to look for additional logic entity in any received input code to identify any additional logic entity that are to be compared to a Structural Code Pattern Descriptor, as represented by arrow 522.

At 530, method 500 includes comparing an identified logic entity to a one or more Structural Code Pattern Descriptors to select a particular Structural code pattern descriptor from one or more Structural Code Pattern Descriptors to use in the comparison. In various embodiments, the particular Structural Code Pattern Descriptor used for the comparison is the Structural Code Pattern Descriptor that has a root node matching the descriptor part of the identified logic entity.

At 540, method 500 includes determining if the logic entity and the succeeding logic entities in the input code match the chain of nodes included in the root node and a path from the root node linking one or more child nodes in the particular structural code pattern descriptor selected for the comparison. In various embodiments, determining if a match exists includes the comparison reaching a terminal child node in the path. If the logic entity and succeeding code in the input code matches the path of the Structural Code Pattern Descriptor, method 500 proceeds to 550.

If the comparison of the logic entity and succeeding code does not match the path of the Structural Code Pattern Descriptor used for the comparison, in various embodiments, no output is generated, and method 500 returns to 520, as represented by arrow 562.

In various embodiments, method 500 at 550 includes generating an output indicating that a match was determined to exist between the input code and at least one Structural Code Pattern Descriptor. In various embodiments, the determination of such a match is indicative that the input code includes malicious code, or is likely to include malicious code. In various embodiments, the generated output includes only a single bit set to a value, such as but not limited to a value of "1," that indicates that a match has been found between some portion of the input code received at 510 and at least one Structural Code Pattern Descriptor used in the comparison of the input code.

In various embodiments, the generation of the output including generation of an indication of the particular path with the tree structure of the Structural Code Pattern Descriptor that included the match with the input code, such as but not limited to a name or an identification number for the particular path.

In various embodiments, method 500 at 550 includes storing the indication of the match for inclusion in a final output. In various embodiments, an indication of a match ends the comparison, and includes generation of a final output at 570, as indicated by arrow 554.

In various embodiments, method 500 at 550 includes storing the generated indication of a match, and proceeding to 560, as indicated by arrow 552.

At 560, method 500 including determining if the end of the input code has been reached. If a determination is made that the end of the input code has not been reached, method 500 progresses back to 520, as indicated by arrow 562. In various embodiments, if a determination is made that the end of the input code has been reached, method 500 progresses to 570.

At 570, method 500 includes generating a final output. In various embodiments, a final output can be a single bit indication of whether or not a match was found in the input code as compared to the one or more Structural Code Pattern Descriptors included in a tree structure used in the comparison. In various embodiments, generate the final output, including checking the status of any stored indications from 550 to see if any matched were indicated.

In various embodiments, generation of a final output includes determining that more than one indication for a match has been identified at 550, and determining which of the indicated matches has a highest match probability. In various embodiments, the highest match probability is determined by calculating an overall match probability for each indicated path in the tree structure that resulted in a match, and providing an output match probability for the match that resulted in the highest match probability during the comparison.

Figure 6:
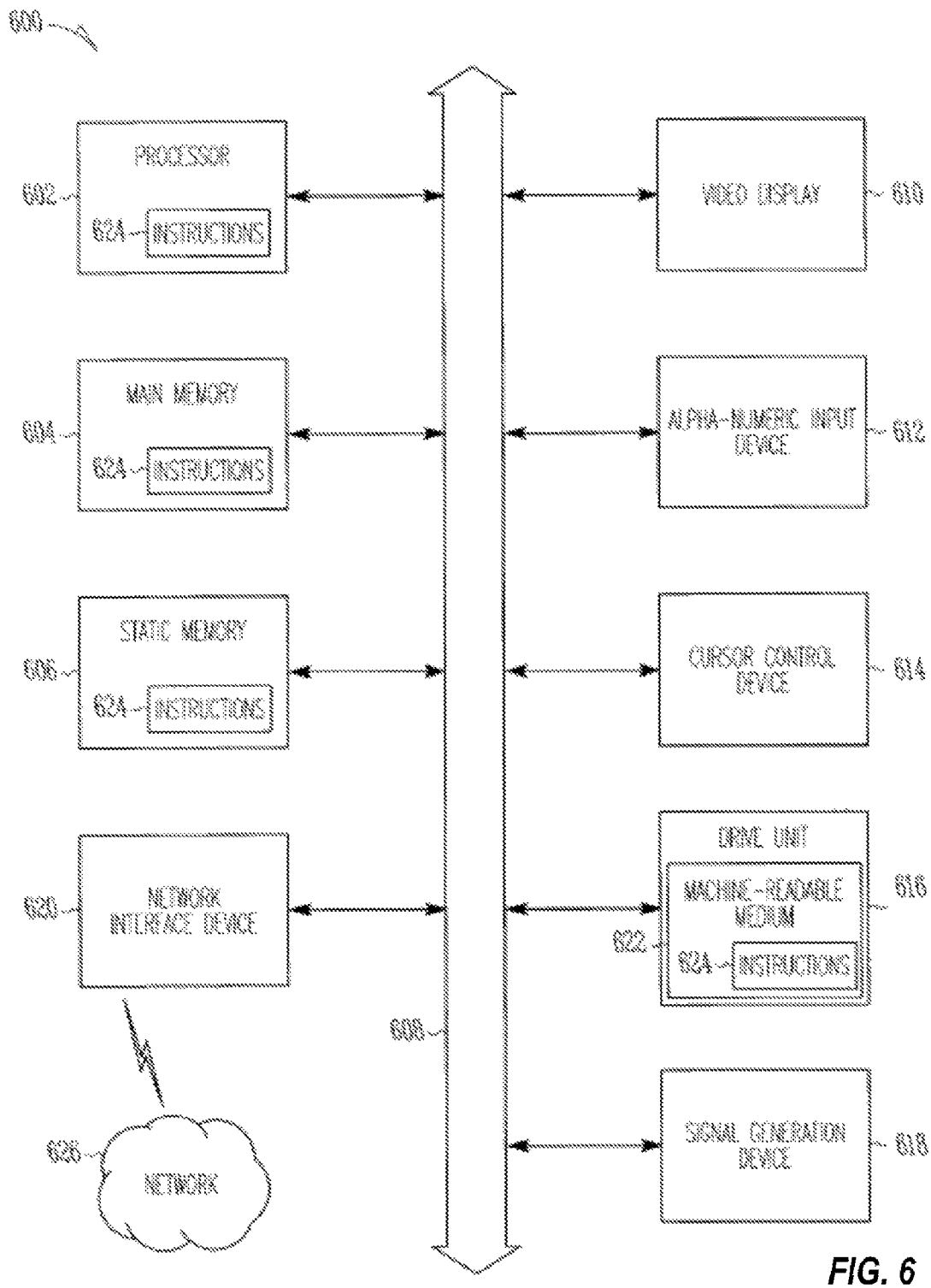
FIG. 6 illustrates an interface for a computer network according to various embodiments.

FIG. 6 illustrates an interface 600 for a computer network according to various embodiments. In various embodiments, interface 600 is an interface to a device or a gateway operable to provide malicious code detection, such as but not limited to interface 140 shown in FIG. 1. In various embodiments, interface 600 includes one or more portions of, or all of, the modules as shown in FIG. 2. In various embodiments, interface 600 includes the system configuration 290 as shown in FIG. 2.

Referring again to FIG. 6, in various embodiments, interface 600 is a diagrammatic representation of a machine in the form of a computer system within which a set of instructions is stored on a memory device and which, when executed by one or more processors, cause the machine to perform any one or more of the methodologies discussed herein. In some embodiments, the machine operates as a standalone device. In some embodiments, the machine is connected (e.g., using a network) to other machines. In a networked deployment, the machine operates in the capacity of a server or a client user machine in server-client user network environment, or as a peer machine in a peer-to-peer (or distributed) network environment.

In various embodiments, the machine comprises a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, IP telephone, or any machine capable of executing a set of instructions (sequential or otherwise) that specify actions to be taken by that machine.

Further, while a single machine is illustrated, the term "machine" shall also be taken to include any collection of machines that individually or jointly execute a set (or multiple sets) of instructions to perform any one or more of the methodologies discussed herein.

In various embodiments, the interface 600 includes any combination of a processor 602 (e.g., a central processing unit (CPU), a graphics processing unit (GPU), or both), a main memory 604 and a static memory 606, which communicate with each other via a bus 608. In various embodiments, interface 600 includes a video display unit 610 (e.g., a liquid crystal display (LCD), a flat panel, a solid state display, or a cathode ray tube (CRT)). In various embodiments, interface 600 includes any combination of an input device 612 (e.g., a keyboard), a cursor control device 614 (e.g., a mouse), a disk drive unit 616, a signal generation device 618 (e.g., a speaker) and a network interface device 620.

In various embodiments, the disk drive unit 616 includes a machine-readable medium 622 on which is stored one or more sets of instructions (e.g., software 624) embodying any one or more of the methodologies or functions described herein, including but not limited to those methods illustrated in FIG. 4 and FIG. 5. In various embodiments, the instructions 624 are stored in, completely or at least partially, within the main memory 604, the static memory 606, and/or within the processor 602 during execution thereof. In various embodiments, the main memory 604 and the processor 602 also constitute a machine-readable media. In various embodiments, the instructions 624 are further transmitted or received over a network 626 via the network interface device 620.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the various embodiments described. The term "machine-readable medium" shall accordingly be taken to include, but not be limited to, solid-state memories, optical and magnetic media, and carrier wave signals.

Various embodiments include an apparatus comprising a detection database including a tree structure of descriptor parts including one or more root nodes and one or more child nodes linked to from one or more parent descriptor parts chains, each of the root nodes representing a descriptor part, and each root node linked to at least one of the child nodes, each root node and each child node linked to any possible additional child nodes, wherein the possible additional child nodes include any possible successor child nodes, and a descriptor comparator coupled to the detection database, the descriptor comparator operable to receive data including a plurality of logic entities, once or successively, and to continuously compare logic entities provided to the tree structure of descriptor parts stored in detection database, and to provide an output based on the comparison.

Various embodiments include a method of comparing input code to one or more structural code pattern descriptors to detect malicious code, comprising receiving at least some portion of an input file including input code that is to be processed, identifying a logic entity in the received input code that is to be compared to at least one structural code pattern descriptor included in a tree structure stored in a detection database, comparing the identified logic entity to one or more structural code pattern descriptors and selecting a particular structural code pattern descriptor to use in the comparison, determining if the identified logic entity and one or more succeeding logic entities included in the input code matches a chain of nodes including the root node and a path from the root node linking one or more child nodes in the particular structural code pattern descriptor selected for the comparison, and if a match exists, generating a single bit output indicating the match.

Various embodiments include a set of instructions stored on a computer memory that, when executed by a processor, perform a method of comparing input code to one or more structural code pattern descriptors to detect malicious code, the method comprising receiving at least some portion of an input file including input code that is to be processed, identifying a logic entity in the received input code that is to be compared to at least one structural code pattern descriptor included in a tree structure stored in a detection database, comparing the identified logic entity to one or more structural code pattern descriptors and selecting a particular structural code pattern descriptor to use in the comparison, determining if the identified logic entity and one or more succeeding logic entities included in the input code matches a chain of nodes including the root node and a path from the root node linking one or more child nodes in the particular structural code pattern descriptor selected for the comparison, and if a match exists, generating a single bit output indicating the match.

Various embodiments include a detection database comprising a plurality of tree structures stored in a detection database, the plurality of tree structures including descriptor parts arranged in one or more descriptor parts chains, each descriptor parts chain including a root node and one or more child nodes linked to the root node, wherein the root node is associated with a compiled descriptor part, and the one or more child nodes each include a different descriptor part that is a possible successor to either the root node or one of the one or more child nodes, and wherein each of the descriptor parts chains represents a structure present in known malware.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

The Abstract is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A non-transitory machine readable medium, on which are stored instructions, comprising instructions that when executed cause a machine to:
   receive a file possibly containing malware; identify a logic entity in the file;
   compare a chain of logic entities beginning with the logic entity to a path through a tree structure of structural code pattern descriptors, comprising instructions that when executed cause the machine to:
      match the logic entity to a root node of the tree structure; and
      match succeeding logic entities of the file with the path through the tree structure of structural code pattern descriptors from the root node to a terminal child node of the path; and
   indicate the file contains malware responsive to matching the chain of logic entities to the path,
   wherein each of the logic entities is:
   a process flow statement:
   a call to application programming interface call or a user-defined function: a definition or modification of a variable:
      one or more variables passed with a call to an application programming interface or function: or
      a boundary between two logically separated code blocks.

2. The non-transitory machine readable medium of claim 1, wherein the instructions further comprise instructions that when executed cause the machine to:
   compare a plurality of chains of logic entities to a plurality of paths through the tree structure of structural code pattern descriptors;
   assign a match probability to each of the plurality of paths; and compare an overall match probability for the file based on the match probabilities assigned to each of the plurality of paths.

3. The non-transitory machine readable medium of claim 1, wherein the instructions that when executed cause the machine to indicate the file contains malware comprise instructions that when executed cause the machine to:
   output a single bit having a bit value indicative of whether or not malware has been detected in the received file based on whether any part of the chain of logic entities matches a path through the tree structure.

4. The non-transitory machine readable medium of claim 1, wherein the instructions that when executed cause the machine to indicate the file contains malware comprise instructions that when executed cause the machine to:
   output a malware name that can be assigned to an input file and represents a type or family of detected malicious code.

5. The non-transitory machine readable medium of claim 1, wherein the instructions that when executed cause the machine to compare a chain of logic entities beginning with the logic entity to a path through a tree structure of structural code pattern descriptors further comprises instructions that when executed cause the machine to:
   determine that the logic entity and succeeding logic entities of the file match a plurality of paths through the tree structure; and
   determine which of the plurality of paths has a highest match probability.

6. The non-transitory machine readable medium of claim 1, wherein the instructions that when executed cause the machine to compare a chain of logic entities beginning with the logic entity to a path through a tree structure of structural code pattern descriptors further comprises instructions that when executed cause the machine to:
   terminate the comparison upon reaching a terminal child node in the path through the tree structure.

7. The non-transitory machine readable medium of claim 1, wherein the instructions that when executed cause the machine to compare the chain of logic entities beginning with the logic entity to a path through a tree structure of structural code pattern descriptors further comprises instructions that when executed cause the machine to:
   begin the comparison upon receiving a portion of the file; and continue to receive the file during the comparison.

8. A programmable device, comprising: one or more processors;
   a memory, on which are stored instructions, comprising instructions that when executed cause at least some of the one or more processors to: receive a file possibly containing malware; identify a logic entity in the file;
   compare a chain of logic entities beginning with the logic entity to a path through a tree structure of structural code pattern descriptors, comprising instructions that when executed cause at least some of the one or more processors to:
match the logic entity to a root node of the tree structure; and match succeeding logic entities of the file with the path through the tree structure of structural code pattern descriptors from the root node to a terminal child node of the path; and
indicate the file contains malware responsive to matching the chain of logic entities to the path,
wherein each of the logic entities is:
a process flow statement:
a call to application programming interface call or a user-defined function; a definition or modification of a variable;
one or more variables passed with a call to an application programming interface or function: or
a boundary between two logically separated code blocks.

9. The programmable device of claim 8, wherein the instructions further comprise instructions that when executed cause at least some of the processors to:
compare a plurality of chains of logic entities to a plurality of paths through the tree structure of structural code pattern descriptors;
assign a match probability to each of the plurality of paths; and compare an overall match probability for the file based on the match probabilities assigned to each of the plurality of paths.

10. The programmable device of claim 9, wherein the instructions that when executed cause at least some of the processors to indicate the file contains malware comprise instructions that when executed cause at least some of the processors to:
output a single bit having a bit value indicative of whether or not malware has been detected in the received file based on whether any part of the chain of logic entities matches a path through the tree structure.

11. The programmable device of claim 9, wherein the instructions that when executed cause at least some of the processors to indicate the file contains malware comprise instructions that when executed cause at least some of the processors to:
output a malware name that can be assigned to an input file and represents a type or family of detected malicious code.

12. The programmable device of claim 9, wherein the instructions that when executed cause at least some of the processors to compare a chain of logic entities beginning with the logic entity to a path through a tree structure of structural code pattern descriptors further comprises instructions that when executed cause at least some of the processors to:
determine that the logic entity and succeeding logic entities of the file match a plurality of paths through the tree structure; and
determine which of the plurality of paths has a highest match probability.

13. The programmable device of claim 9, wherein the instructions that when executed cause at least some of the processors to compare a chain of logic entities beginning with the logic entity to a path through a tree structure of structural code pattern descriptors further comprises instructions that when executed cause at least some of the processors to:
terminate the comparison upon reaching a terminal child node in the path through the tree structure.

14. The programmable device of claim 9, wherein the instructions that when executed cause at least some of the processors to compare the chain of logic entities beginning with the logic entity to a path through a tree structure of structural code pattern descriptors further comprises instructions that when executed cause at least some of the processors to:
begin the comparison upon receiving a portion of the file; and continue to receive the file during the comparison.

15. A method for detecting malware, comprising:
receiving by a programmable device a file possibly containing malware;
identifying by the programmable device a logic entity in the file;
comparing by the programmable device a chain of logic entities beginning with the logic entity to a path through a tree structure of structural code pattern descriptors, comprising:
matching the logic entity to a root node of the tree structure; and
matching succeeding logic entities of the file with the path through the tree structure of structural code pattern descriptors from the root node to a terminal child node of the path; and
indicating by the programmable device the file contains malware responsive to matching the chain of logic entities to the path,
wherein each of the logic entities is:
a process flow statement;
a call to application programming interface call or a user-defined function; a definition or modification of a variable;
one or more variables passed with a call to an application programming interface or function; or
a boundary between two logically separated code blocks.

16. The method of claim 15, further comprising:
comparing a plurality of chains of logic entities to a plurality of paths through the tree structure of structural code pattern descriptors;
assigning a match probability to each of the plurality of paths; and comparing an overall match probability for the file based on the match probabilities assigned to each of the plurality of paths.

17. The method of claim 15, wherein indicating the file contains malware comprises:
outputting a single bit having a bit value indicative of whether or not malware has been detected in the received file based on whether any part of the chain of logic entities matches a path through the tree structure.

18. The method of claim 15, wherein indicating the file contains malware comprises:
outputting a malware name that can be assigned to an input file and represents a type or family of detected malicious code.

19. The method of claim 15, wherein comparing a chain of logic entities beginning with the logic entity to a path through a tree structure of structural code pattern descriptors further comprises:
determining that the logic entity and succeeding logic entities of the file match a plurality of paths through the tree structure; and
determining which of the plurality of paths has a highest match probability.

20. The method of claim 15, wherein comparing a chain of logic entities beginning with the logic entity to a path through a tree structure of structural code pattern descriptors further comprises:

terminating the comparison upon reaching a terminal child node in the path through the tree structure.

* * * * *